(12) United States Patent
Arita et al.

(10) Patent No.: US 6,388,568 B1
(45) Date of Patent: May 14, 2002

(54) APPARATUS AND METHOD FOR ALARMING DECREASE IN TIRE AIR-PRESSURE

(75) Inventors: Masakazu Arita; Minao Yanase, both of Kobe (JP)

(73) Assignees: Sumitomo Rubber Industries, Kobe; Sumitomo Electric Industries, Osaka, both of (JP)

( * ) Notice: Subject to any disclaimer, the term of this patent is extended or adjusted under 35 U.S.C. 154(b) by 0 days.

(21) Appl. No.: 09/906,693

(22) Filed: Jul. 18, 2001

(30) Foreign Application Priority Data

Jul. 18, 2000 (JP) ........................................ 2000-217568

(51) Int. Cl.[7] .............................................. B60C 23/00
(52) U.S. Cl. ........................ 340/442; 340/447; 340/444
(58) Field of Search ................................ 340/438, 442, 340/443–444, 445–447; 180/197; 73/146.2, 146.8

(56) References Cited

U.S. PATENT DOCUMENTS

| | | | |
|---|---|---|---|
| 6,232,873 B1 | * 5/2001 | Dezorzi | 340/442 |
| 6,259,360 B1 | * 7/2001 | Takamura | 340/445 |
| 6,275,148 B1 | * 8/2001 | Takamura et al. | 340/442 |
| 6,278,363 B1 | * 8/2001 | Bezek et al. | 340/442 |
| 6,323,765 B1 | * 11/2001 | Horie et al. | 340/442 |

FOREIGN PATENT DOCUMENTS

| | | |
|---|---|---|
| JP | 7-16842 | 1/1995 |
| JP | 10-6724 | 1/1998 |
| JP | 11-123911 | 5/1999 |
| JP | 2000-190718 | 7/2000 |

* cited by examiner

*Primary Examiner*—Daryl Pope
(74) *Attorney, Agent, or Firm*—Birch Stewart Kolasch & Birch, LLP (57) ABSTRACT

An apparatus for alarming decrease in tire air-pressure which alarms decrease of internal pressure of a tire on the basis of a rotational information. The apparatus comprises rotational information detecting means; memory means for storing the rotational information of each of the tires; calculation processing means for calculating a reciprocal number of a turning radius and calculating a judged value from the rotational information of the respective tires; internal pressure judging means for comparing the judged value with a reference value for the judged value at every regions in right turning regions and left turning regions so as to judge decrease in internal pressure; torque judging means for judging decrease in limited slip differential torque of the limited slip differential device; and updating means for initializing the reference value for updating the reference value. The judgement accuracy can be maintained. Thereby, the erroneous alarm is prevented from being issued and decrease in air-pressure can be judged accurately.

6 Claims, 8 Drawing Sheets

APPARATUS AND METHOD FOR ALARMING DECREASE IN TIRE AIR-PRESSURE

BACKGROUND OF THE INVENTION

The present invention relates to an apparatus and method for alarming decrease in tire air-pressure. In particular, the present invention relates to an apparatus and method for alarming decrease in tire air-pressure which can suitably judge decrease in an internal pressure of a tire in a vehicle mounting a limited slip differential device (LSD) thereon so as to securely prevent an erroneous alarm from being issued.

Conventionally, there has been known a matter that a dynamic load radius of the tire becomes small and a rotational speed becomes faster in comparison with a tire having a normal pneumatic pressure when a pneumatic pressure of the tire is decreased. For example, in Japanese Unexamined Patent Publication No. 149119/1995, there has been proposed a method of detecting decrease in internal pressure on the basis of a relative difference of number of revolution of the tire. Further, since the rotational speed of the tire is influenced by turning, speed acceleration and deceleration, load, speed of a vehicle and the like, various devices are considered in order to remove the influences.

However, among the vehicle in recent years, in order to improve a running performance such as cornering performance, there is a vehicle in which a limited slip differential device is mounted in a differential gear of a driving shaft. The limited slip differential device is so arranged that a differential operation is limited until a differential torque is over a set value in view of its mechanism, and the right and left driving wheels are rotated at a uniform speed. Accordingly, since an influence of decrease in a pneumatic pressure is not reflected to the number of revolution, it is impossible to detect the pressure decrease by a relative comparison of the number of revolution.

Figure 7:
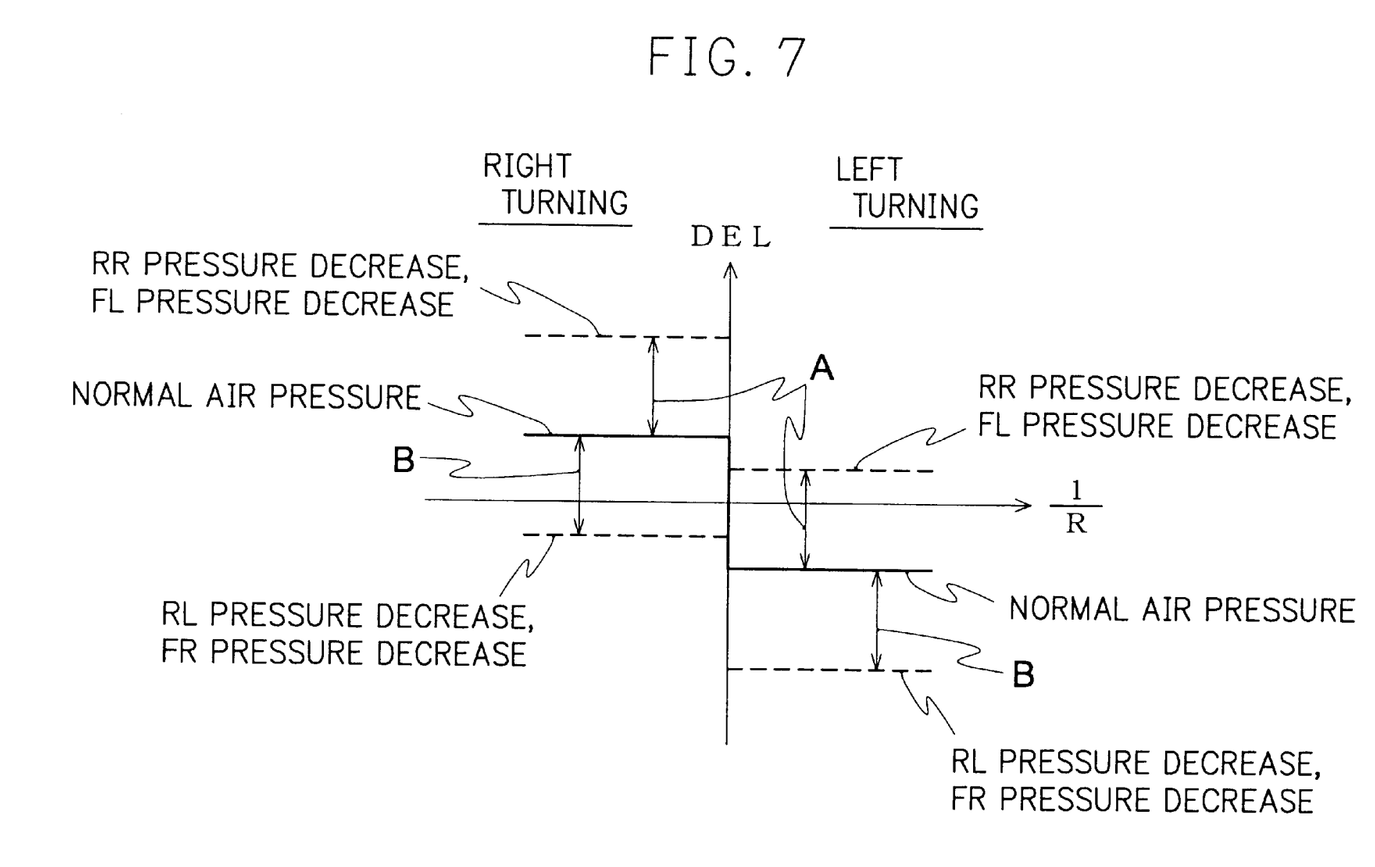
FIG. 7 is a view showing a relation between a DEL value and a reciprocal number of a turning radius calculated from a difference between right and left driving wheels.

Judged values (DEL values) are collected on a portion having a relation of horizontal axis=0, that is, a vertical axis (Y axis) while the differential operation is limited regardless of an existence of the pressure decrease and a position, when a pressure of a tire in a rear right tire RR or a front left tire FL is decreased and a pressure of a tire in a rear left tire RL or a front right tire FR is decreased as shown in FIG. 7 in which a reciprocal number 1/R of a turning radius R calculated from the driving shaft is set to a horizontal axis (X axis). Accordingly, the applicant of the present application has found that the pressure decrease can be easily judged by comparing the judged value in a horizontal portion a little apart from the vertical axis (refer to Japanese Unexamined Patent Publication No. 123911/1999). Therefore, the arrangement is made such that when a difference A or B between the judged value at a time of pressure decrease and the DEL value of the normal pneumatic pressure is over a certain range, it is judged that the pneumatic pressure of the certain tire is decreased, whereby an alarm is issued.

Figure 8:
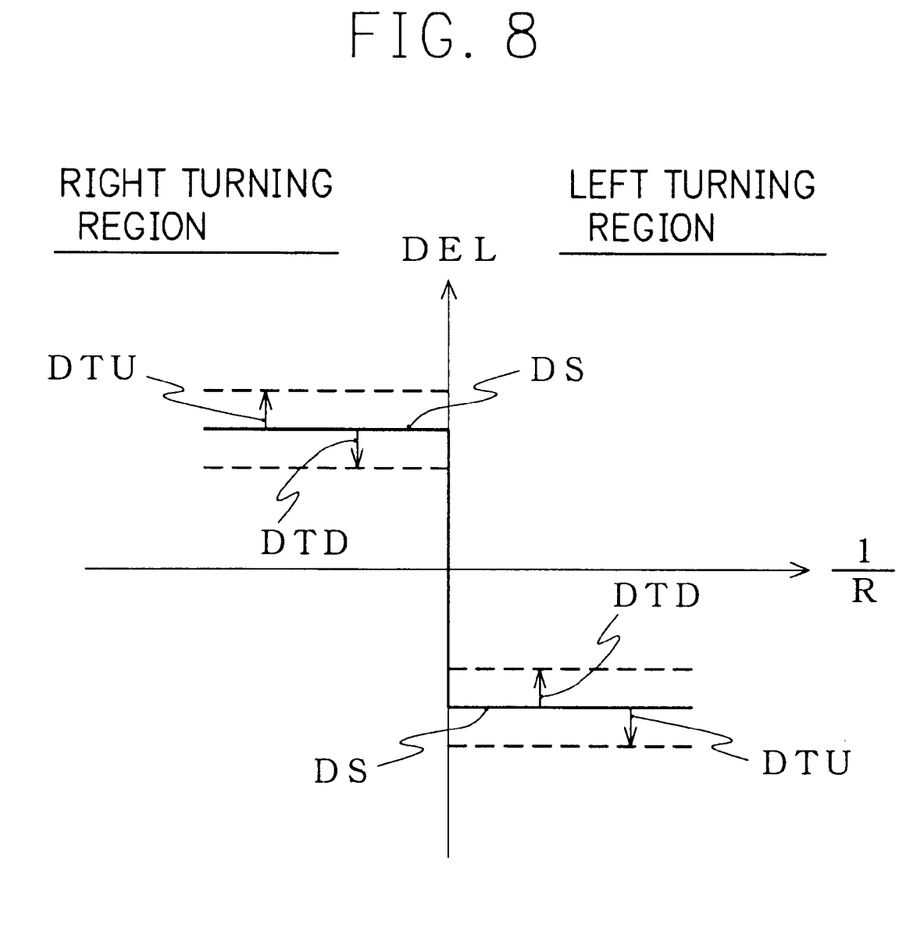
FIG. 8 is an explanatory view showing change in judged values due to change in limited differential torque with the passage of time.

However, in a clutch plate type LSD or the like, there is a case that the limited slip differential torque is changed with the passage of time. For example, in the case where the limited slip differential torque is decreased (DTD) or increased (DTU) as shown in FIG. 8 in comparison with a time of setting the pneumatic pressure of the tire to the normal pneumatic pressure and initializing a pneumatic pressure alarm apparatus (at a normal time), there is a risk that the DEL value is changed even when the pneumatic pressure of the tire is normal, and an erroneous alarm is issued in case the difference DTD or DTU with respect to the DEL value of the normal pneumatic pressure DS becomes equal to or more than a certain range.

The present invention is made in view of the above circumstances, and an object there of is to provide an apparatus and method for alarming decrease in tire air-pressure which can suitably judge decrease in an internal pressure of a tire in a vehicle mounting a limited slip differential device (LSD) thereon so as to securely prevent an erroneous alarm from being generated.

SUMMARY OF THE INVENTION

In accordance with the present invention, there is provided an apparatus for alarming decrease in tire air-pressure which alarms decrease of internal pressure of a tire on the basis of a rotational information obtained by tires attached to a four-wheeled vehicle mounting a limited slip differential device thereon, comprising:

rotational information detecting means for detecting a rotational information of each of the tires;

memory means for storing the rotational information of each of the tires;

calculation processing means for calculating a reciprocal number of a turning radius from the rotational information of the tire attached to a driving shaft among the rotational information of the respective tires and calculating a judged value from the rotational information of the respective tires;

internal pressure judging means for comparing the judged value with a reference value for the judged value at every regions in right turning regions and left turning regions of the turning radius on the basis of a relation between the reciprocal number of the turning radius and the judged valve so as to judge decrease in internal pressure;

torque judging means for judging decrease in limited slip differential torque of the limited slip differential device on the basis of respective judged value in the right turning region and the left turning region; and updating means for initializing the reference value for updating the reference value.

Further, in accordance with the present invention, there is provided a method for alarming decrease in tire air-pressure which alarms decrease of internal pressure of a tire on the basis of a rotational information obtained by tires attached to a four-wheeled vehicle mounting a limited slip differential device thereon, comprising the steps of:

detecting a rotational information of each of the tires;

storing the rotational information of each of the tires;

calculating a reciprocal number of turning radius from the rotational information of the tire attached to a driving shaft among the rotational information of the respective tires and calculating a judged value from the rotational information of the respective tires;

comparing the judged value with a reference value for the judged value at every regions in right turning regions and left turning regions of the turning radius on the basis of a relation between the reciprocal number of the turning radius and the judged valve so as to judge decrease in internal pressure;

judging decrease in limited slip differential torque of the limited slip differential device on the basis of respective judged value in the right turning region and the left turning region; and initializing the reference value for updating the reference value.

DETAILED DESCRIPTION

Hereinbelow, there is explained an apparatus and method for alarming decrease in tire air-pressure of the present invention with reference to the accompanying drawings.

Figure 1:
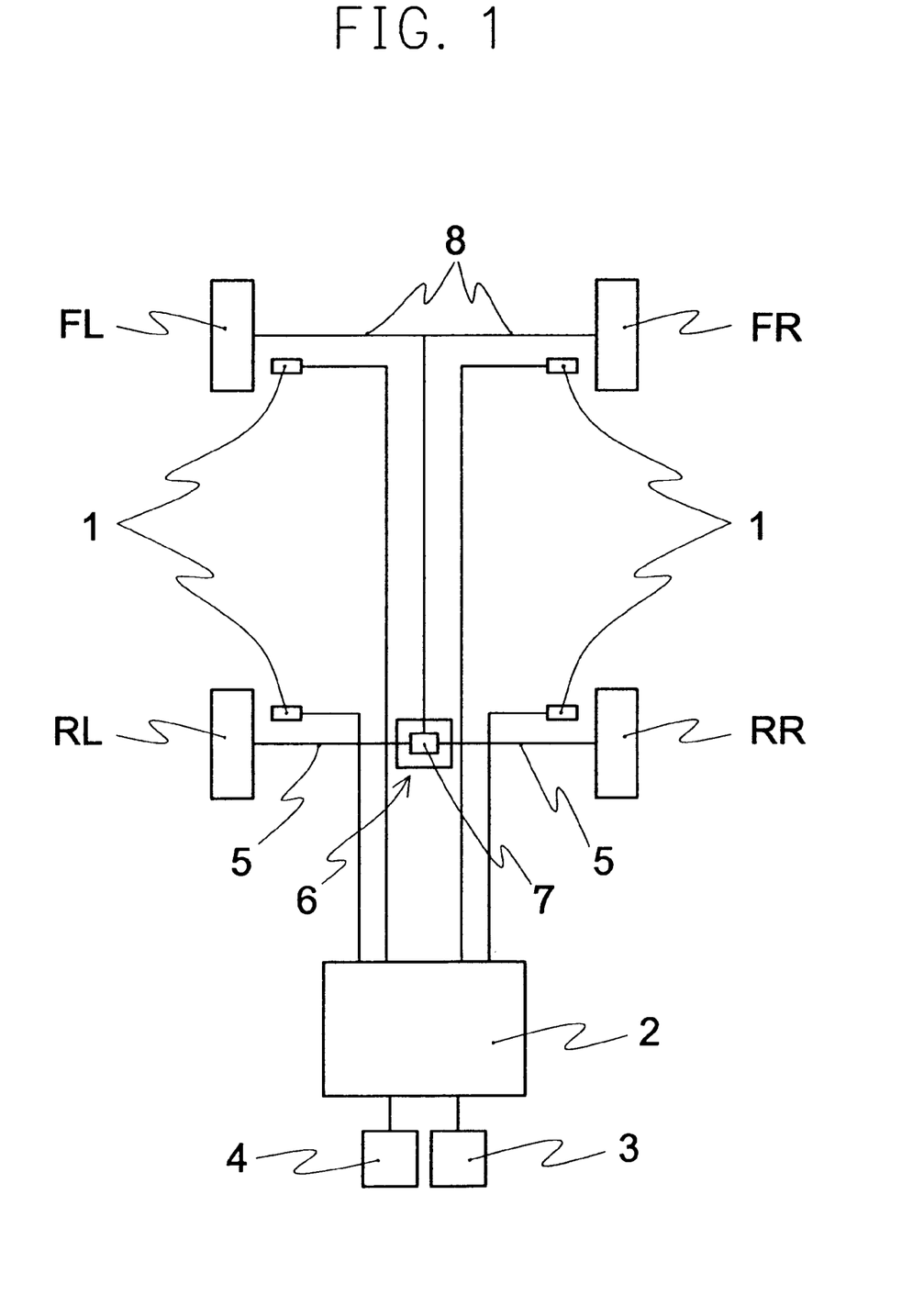
FIG. 1 is a block diagram showing one embodiment of an apparatus for alarming decrease in tire air-pressure of the present invention.

As shown in FIG. 1, an apparatus for alarming decrease in tire air-pressure is so designed as to detect whether or not pneumatic pressures of four tires FL, FR, RL and RR attached to a four-wheeled vehicle are decreased, and is provided with popular wheel speed sensors 1 respectively provided in connection with the tires FL, FR, RL and RR. The wheel speed sensor 1 detects a rotational information, for example, number of revolution, rotational speed, angular velocity or the like of each of the tires. Further, an output of the wheel speed sensor 1 is applied to a control unit 2. To the control unit 2, a display device 3 for informing of the tire FL, FR, RL and RR having a decreased pneumatic pressure, the display device 3 being constituted by a liquid crystal display element, a plasma display element, a CRT or the like, and an initializing switch 4 capable of being operated by a driver or the like are connected. Further, a limited slip differential device 7 is mounted on a differential gear 6 of a driving shaft 5. In this case, reference numeral 8 denotes a following shaft.

Figure 2:
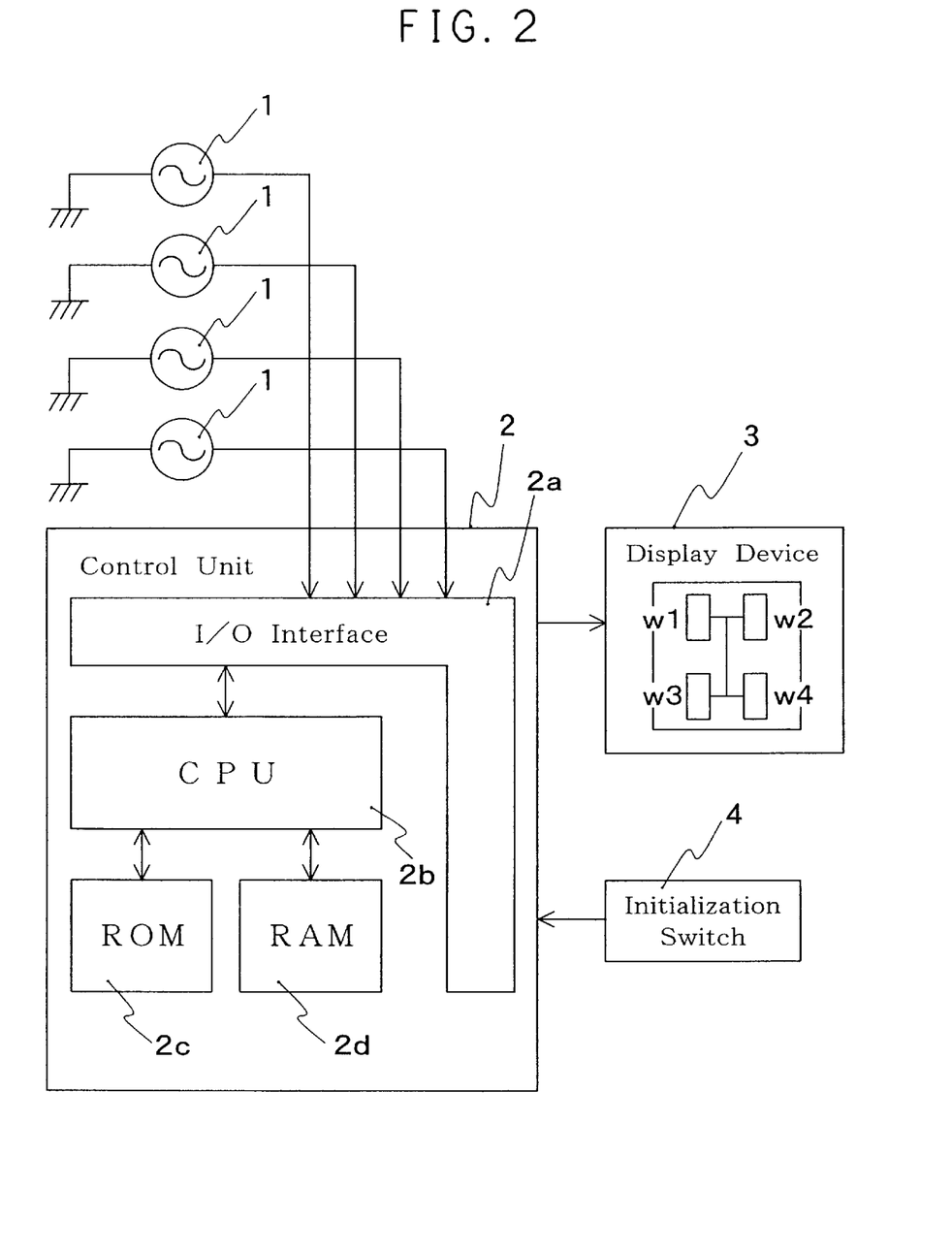
FIG. 2 is a block diagram showing an electric arrangement of an apparatus for alarming decrease in tire air-pressure shown in FIG. 1.
Figure 3:
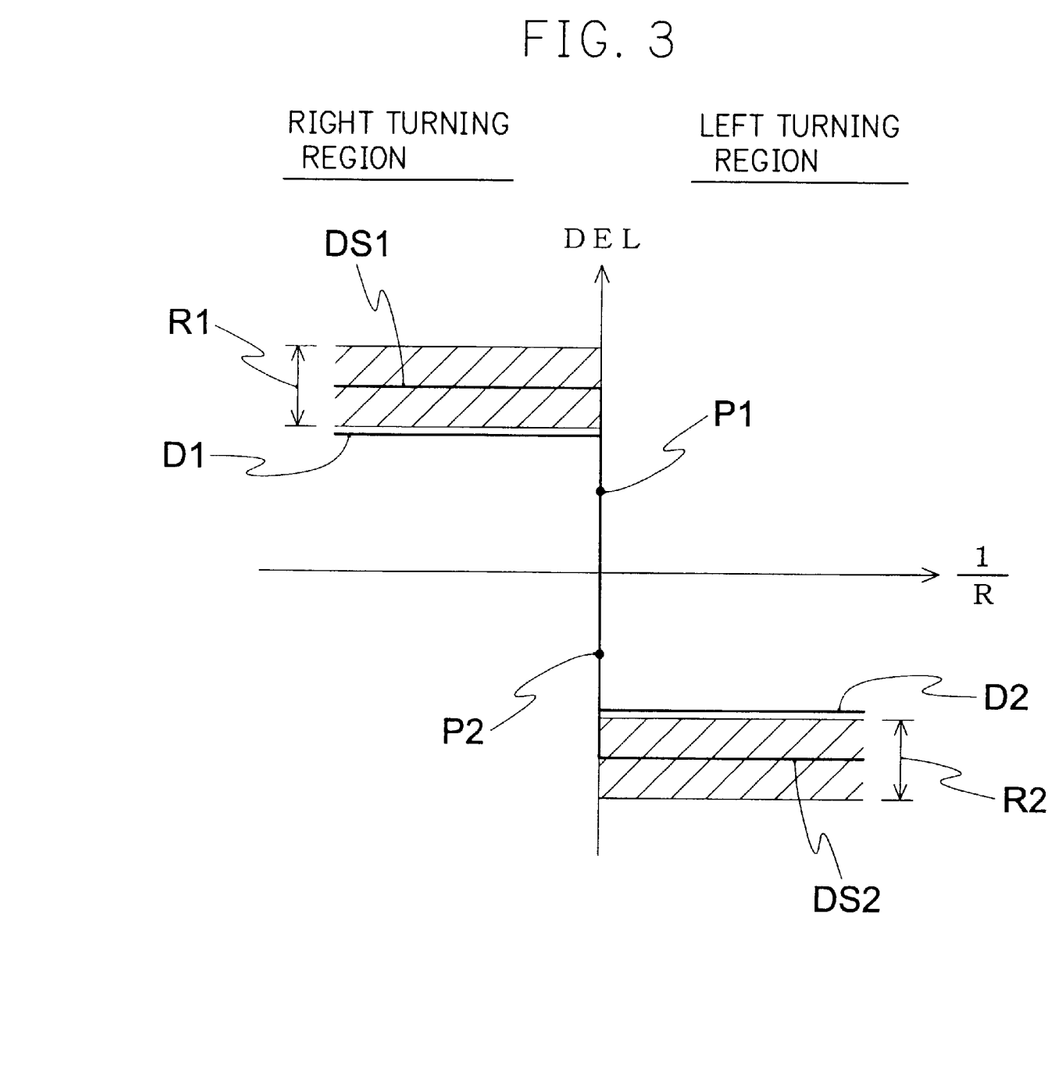
FIG. 3 is a schematic view showing DEL value at a time when the limited slip differential torque is decreased.

The control unit 2 includes, as shown in FIG. 2, an I/O interface 2a required for giving and taking a signal with respect to an external device, a CPU 2b functioning as a center of a calculating process, a ROM 2c storing a control operation program of the CPU 2b and a RAM 2d in which data is temporarily written or the written data is read at a time when the CPU 2b executes the control operation.

In the present invention, there are provided rotational information detecting means, memory means, calculation processing means, internal pressure judging means and updating means.

The memory means stores a rotational information of each of the tires detected by the rotational information detecting means, and the calculation processing means respectively calculates a reciprocal number of a turning radius from the rotational information of the tire attached to the driving shaft among the respective tire rotational information and calculates a judged value from the rotational information of the respective tires. Then, the internal pressure judging means compares the judged value with the reference value at every regions of the turning radius so as to judge decrease in internal pressure, on the basis of a relation between the reciprocal number of the turning radius and the judged value.

However, in the case where the limited slip differential torque of the LSD mounted on the vehicle changes with the passage of time, there is a risk that an erroneous alarm is issued even when the pneumatic pressure of the tire is normal. Therefore, in accordance with the present invention, the apparatus is characterized that it includes torque judging means for judging decrease in limited slip differential torque of the limited slip differential device on the basis of respective judged value in the right turning region and the left turning region, and updating means for initializing the reference value for updating the reference value.

It is preferable that the initialization of reference values in the updating means is performed when the absolute value of the judged value in the decreased limited differential torque is decreased to not more than the first threshold, or when absolute values of the respective judged values are substantially equal to each other between the right turning region and the left turning region and the absolute value of the judged values are not more than the second threshold.

In the present embodiment, the wheel speed sensor 1 corresponds to the rotational information detecting means, and the control unit 2 corresponds to the memory means, the calculation processing means, the internal pressure judging means, the torque judging means and the updating means.

Next, a description will be given of the calculation processing, internal pressure judgement, torque judgement, and updating in accordance with the present invention, with respect to the case where a judged value (DEL value) is set to a ratio between a result obtained by subtracting a sum of signals from another pair of tire wheels on a diagonal line from a sum of signals from a pair of tire wheels on the diagonal line, and an average value of two sums.

Firstly, since the right and left driving wheels rotate at the same speed until the turn is performed so that the torque over a determined limited slip differential torque is generated, the DEL value calculated by the following formula (1) is in proportion to a difference between the right and left following wheels during the period.

$$DEL = \frac{\frac{V_{(1)} + V_{(4)}}{2} - \frac{V_{(2)} + V_{(3)}}{2}}{\frac{V_{(1)} + V_{(2)} + V_{(3)} + V_{(4)}}{4}} \times 100 \quad (1)$$

In the formula (1), V(X) is a tire rotational speed (m/sec) and x is a tire in which 1 is a front left tire, 2 is a front right tire, 3 is a rear left tire and 4 is a rear right tire.

That is, since the limited slip differential torque is dependent upon the turning radius as far as the vehicle does not run on a specific road surface, there has been known that, in the case where a reciprocal number $1/R_0$ of a turning radius $R_0$ is calculated from the difference between the right and left following wheels in accordance with the following formula (2) and the DEL value is employed for the judging value of pressure decrease, the DEL value becomes the difference itself between the right and left following wheels during the period that the differential operation is limited, and the DEL value becomes substantially fixed when the limitation is released.

$$\frac{1}{R_0} = \frac{1}{T_W} \times \frac{V(1) - V(2)}{V_{AVE}} \quad (2)$$

In this formula (2), $T_w$ is a tread width and $V_{AVE}$ is an average speed of the right and left tires.

In this case, since the DEL value is severely changed by a speed of the vehicle, a driving force, a lateral acceleration (lateral G) or the like, it is preferable to reduce a dispersion of the DEL value so as to improve an accuracy by previously searching an influence in accordance with a vehicle tuning so as to apply correction, for example, with respect to a load movement at a time of turning, a change in the DEL value due to the driving force, or a sensitivity correction of the DEL due to the vehicle speed.

In the relation between the reciprocal number $1/R_0$ of the turning radius of the following wheel and the DEL value mentioned above, when the pressure of the driving wheel is decreased, a center turning radius to be differential limited is shifted, and when the pressure of the following wheel is decreased, the calculation of the turning radius itself is shifted, so that the DEL value moves in parallel in a vertical direction along a line (a diagonal line) of the difference between the right and left following wheels. Accordingly, it is necessary to judge the pressure decrease by comparing a horizontal portion of the normal pneumatic pressure condition with a horizontal portion of the decreased pressure condition. Thus, it is necessary to identify from where a horizontal portion starts in both conditions. However, since the horizontal portion is changed in accordance with material or size of a tire, property such as rigidity, a pressure decrease amount of the tire or the like, it is very hard to define the horizontal portion (region).

Then, in the same manner as that of the conventional art, the present invention performs the internal pressure judging step by using experimental results obtained by running the vehicle mounting the LSD thereon to which the tire (tire size 225/45R17) having a normal pneumatic pressure (220 Kpa) is attached, on a public road in German including Autobahn, and running the vehicle in which the pneumatic pressures of four tires attached to the LSD mounting vehicle are respectively and independently 40% decreased, in the same manner as that of the tire having the normal pneumatic pressure. That is, the reciprocal number 1/R of the turning radius R calculated from the driving wheels and the DEL value are respectively set to the horizontal axis and the vertical axis, the relation between the reciprocal number 1/R of the turning radius R and the DEL value is searched, and thereafter, the value 1/R is separated into the following three regions, then, the data is simply averaged.

Right Turn: $1/R < -0.002$

Straight Run: $-0.002 \leq 1/R \leq 0.002$

Left Turn: $1/R > 0.002$

Accordingly, since the horizontal portion can be easily determined, the comparison with the reference value (in this case, the average of the judged values near the straight run, at the left turn and at the right turn is calculated in the initializing run with the general internal pressure and this average is previously stored as the reference value at a time of initializing) at the normal pneumatic pressure, and the decrease in internal pressure is judged by comparing the DEL value with the reference value at every regions of the turning radius 1/R. When the dispersion of the data in the straight portion is much, the pressure decrease judgement can be performed by increasing a threshold for pressure decrease judgement.

Figure 5:
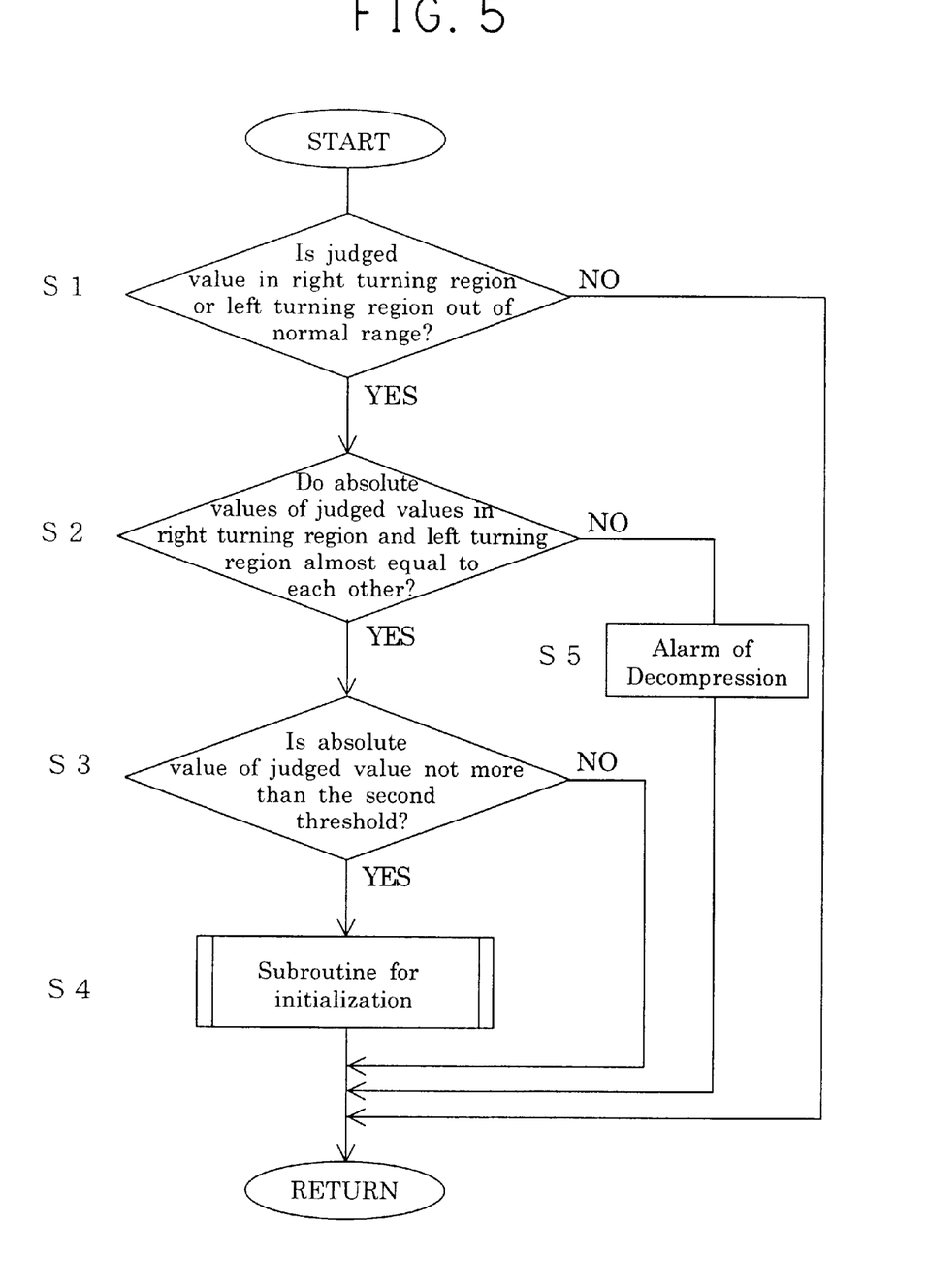
FIG. 5 is one embodiment of a flow chart in accordance with the present invention.
Figure 6:
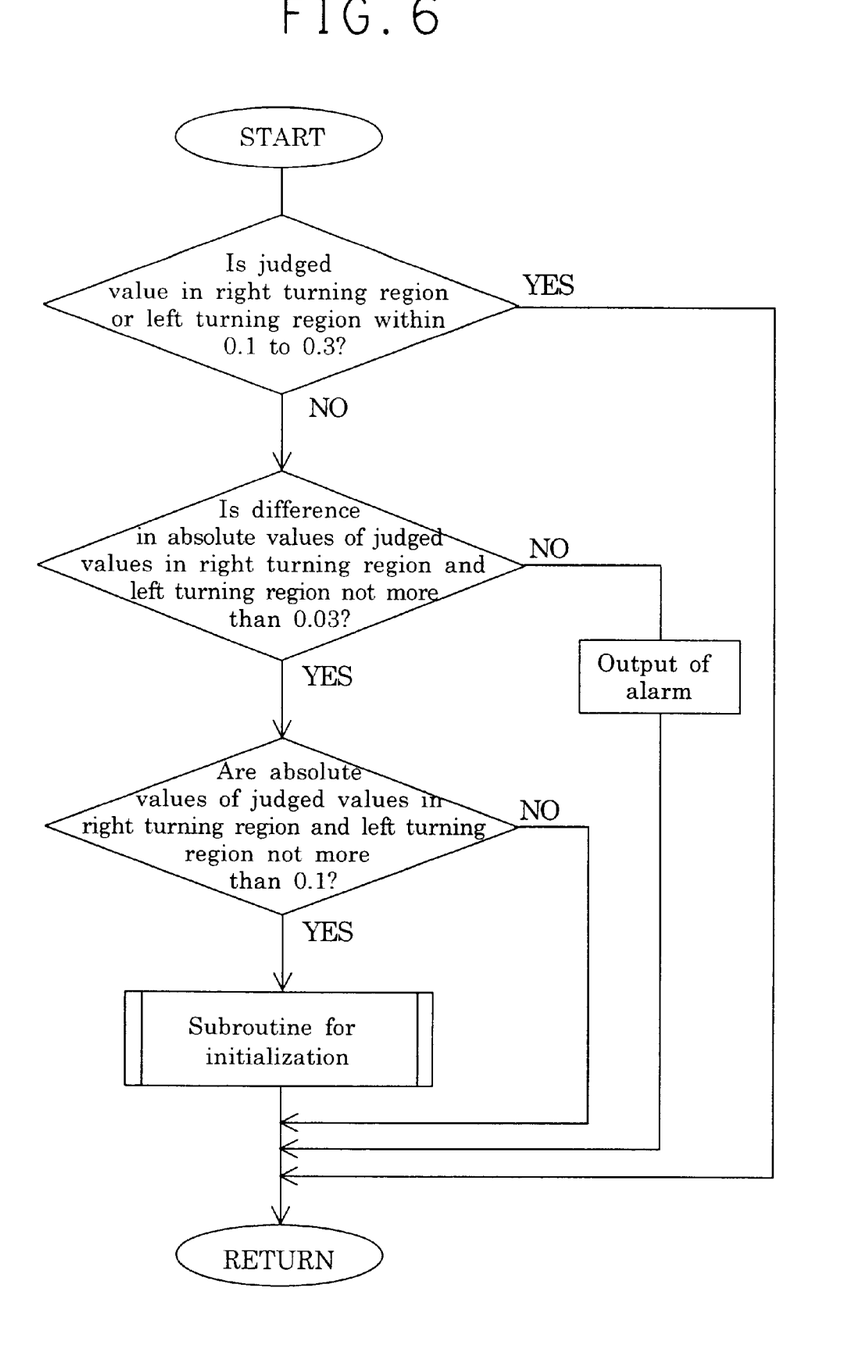
FIG. 6 is a flow chart of one embodiment.

Further, in accordance with the present invention, in the case where it is judged by the internal pressure judging means that the pneumatic pressure is decreased, the following torque judgement and updating are performed (refer to FIG. 5). That is, in case the limited differential torque of LSD is decreased when the limited differential torque is varied, there are cases where the respective judged values D1, D2 in the right turning region and left turning region shift from the normal range (region) R1, R2 with respect to the reference judged values DS1, DS2 under normal condition (step S1).

Since the judged values D1, D2 satisfy the condition that D1 nearly equals to D2, however, when the tire is under a normal air pressure, there can be found that air pressure of the tire is not decreased when the condition that D1 nearly equals to D2 is not satisfied.

Figure 4:
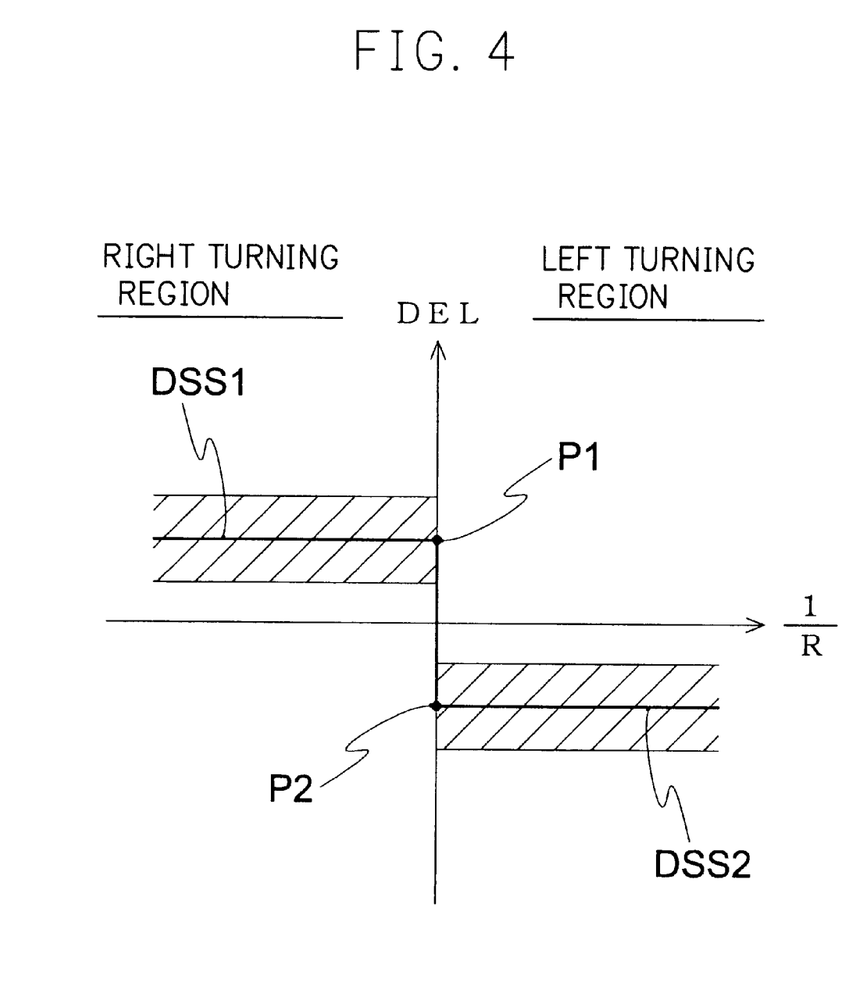
FIG. 4 is a view explaining the updating of the reference value of the judged value.

Accordingly, in case the absolute value of the judged value D1 which nearly equals to D2 in the decreased limited differential torque is decreased to not more than the first threshold P1, P2, initialization is automatically performed with respect to the reference values DS1, DS2 of judged values to reset (update) the reference values DS1, DS2 to new reference values DSS1, DSS2 as shown in FIG. 4. The initialization of reference values is alternatively performed when the absolute values of judged values are almost equal to each other between the right turning region and the left turning region and when the absolute values of judged values are not more than the second threshold (steps S2~S4). In case the absolute values of judges values are not almost equal to each other between the right turning region and the left turning region, it is judged that air pressure of any of tires is decreased so that alarm for decompression is generated (step S5). With this arrangement, the reference value is updated to a proper one before generation of erroneous alarm even when the limited differential torque of LSD is decreased due to change with the passage of time, so that judgement accuracy is maintained and erroneous alarm is prevented from being generated thereby enabling accurate judgement of decrease in tire air-pressure.

In this case, it is known that the DEL value near the straight line in a winter tire becomes larger than the judged value (DEL value) near the straight line in a summer tire, and that the judged values in the left turning region and the right turning region are different from each other.

Therefore, in accordance with the present invention, since it is possible to determine that the winter tire is employed when the absolute values of the reference value at a time of turning right and left are both equal to or more than 0.1, and that the summer tire is employed in the other cases, the decrease in internal pressure is judged by comparing the judged value with the reference value at every regions of the turning radius on the basis of the relation between the reciprocal number of the turning radius and the judged value, after identifying whether the tire attached to the driving shaft is the summer tire or the winter tire. Next, when the difference between the judged value in the right turning region and the judged value in the left turning region is different from the reference difference, the updating means cancel the judgement of the decrease in internal pressure and prevents the erroneous alarm from being issued. In this case, in order to identify whether the tire is the summer tire or the winter tire, it is preferable to provided with the identifying means determining on the basis of the relation between the reciprocal number of the turning radius and the judged value.

Next, a description will be given of the present invention on the basis of an example, however, the present invention is not limited only to the example.

EXAMPLE

A vehicle having a displacement of 2500 cc and mounting thereon LSD was prepared. In the present example, it was judged whether the absolute value of judged value in the right turning region or the left turning region was within the normal range of 0.1 to 0.3, and if it was not within the range, then it was judged whether a difference between absolute values of judged values in the right turning region and the left turning region was not more than 0.03. If the difference in absolute values was more than 0.03, air-pressure of any of tires was judged to be decreased for generating output of alarm for decompression. On the other hand, if the difference in absolute values was not more than 0.03, then it was judged whether the respective absolute value of judged values in the right turning region and the left turning region was not more than 0.1. If the absolute value of judged values was not more then 0.1, calibration mode was started automatically to obtain a new reference value. In the present example, the reference value of LSD at which tire air-pressure was normal was reset automatically to a new reference value of 0.075.

Next, the running test was performed with tire air-pressure of the vehicle being decreased by 40% from 220 Kpa. It was found that no erroneous alarm was generated and decrease in air-pressure was judged accurately.

As mentioned above, according to the present invention, since the reference value is automatically updated to a proper one before generation of erroneous judgement even when the limited differential torque is decreased due to change with the passage of time, the judgement accuracy can be maintained. Thereby, the erroneous alarm is prevented from being generated and decrease in air-pressure can be judged accurately.

What is claimed is:

1. An apparatus for alarming decrease in tire air-pressure which alarms decrease of internal pressure of a tire on the basis of a rotational information obtained by tires attached to a four-wheeled vehicle mounting a limited slip differential device thereon, comprising:

rotational information detecting means for detecting a rotational information of each of the tires;

memory means for storing the rotational information of each of the tires;

calculation processing means for calculating a reciprocal number of a turning radius from the rotational information of the tire attached to a driving shaft among the rotational information of the respective tires and calculating a judged value from the rotational information of the respective tires;

internal pressure judging means for comparing the judged value with a reference value for the judged value at every regions in right turning regions and left turning regions of the turning radius on the basis of a relation between the reciprocal number of the turning radius and the judged valve so as to judge decrease in internal pressure;

torque judging means for judging decrease in limited slip differential torque of the limited slip differential device on the basis of respective judged value in the right turning region and the left turning region; and updating means for initializing the reference value for updating the reference value.

2. The apparatus of claim 1, wherein the initialization of reference values in the updating means is performed when the absolute value of the judged value in the decreased limited slip differential torque is decreased to not more than the first threshold.

3. The apparatus of claim 1, wherein the initialization of reference values in the updating means is performed when absolute values of the respective judged values are substantially equal to each other between the right turning region and the left turning region and the absolute value of the judged values are not more than the second threshold.

4. A method for alarming decrease in tire air-pressure which alarms decrease of internal pressure of a tire on the basis of a rotational information obtained by tires attached to a four-wheeled vehicle mounting a limited slip differential device thereon, comprising the steps of:

detecting a rotational information of each of the tires;

storing the rotational information of each of the tires;

calculating a reciprocal number of turning radius from the rotational information of the tire attached to driving shaft among the rotational information of the respective tires and calculating a judged value from the rotational information of the respective tires;

comparing the judged value with a reference value for the judged value at every regions in right turning regions and left turning regions of the turning radius on the basis of a relation between the reciprocal number of the turning radius and the judged valve so as to judge decrease in internal pressure;

judging decrease in limited slip differential torque of the limited slip differential device on the basis of respective judged value in the right turning region and the left turning region; and initializing the reference value for updating the reference value.

5. The method of claim 4, wherein the initialization of reference values in the updating means is performed when the absolute value of the judged value in the decreased limited slip differential torque is decreased to not more than the first threshold.

6. The method of claim 4, wherein the initialization of reference values in the updating means is performed when absolute values of the respective judged values are substantially equal to each other between the right turning region and the left turning region and the absolute value of the judged values are not more than the second threshold.

* * * * *